(12) United States Patent
Hoshiba et al.

(10) Patent No.: US 9,419,285 B2
(45) Date of Patent: Aug. 16, 2016

(54) ALL-SOLID BATTERY

(71) Applicant: Samsung Electronics Co., Ltd., Suwon-si, Gyeonggi-do (KR)

(72) Inventors: Koji Hoshiba, Kanagawa (JP); Satoshi Fujiki, Kanagawa (JP); Takanobu Yamada, Kanagawa (JP); Yuichi Aihara, Kanagawa (JP)

(73) Assignee: SAMSUNG ELECTRONICS CO., LTD. (KR)

( * ) Notice: Subject to any disclaimer, the term of this patent is extended or adjusted under 35 U.S.C. 154(b) by 19 days.

(21) Appl. No.: 14/099,073

(22) Filed: Dec. 6, 2013

(65) Prior Publication Data

US 2014/0162140 A1 Jun. 12, 2014

(30) Foreign Application Priority Data

Dec. 7, 2012 (JP) .................................. 2012-268852
Sep. 23, 2013 (KR) ........................ 10-2013-0112870

(51) Int. Cl.
*H01M 4/62* (2006.01)
*H01M 10/0562* (2010.01)

(52) U.S. Cl.
CPC .............. *H01M 4/622* (2013.01); *H01M 4/623* (2013.01); *H01M 10/0562* (2013.01)

(58) Field of Classification Search
CPC .............. H01M 10/02; H01M 10/052; H01M 10/0562; H01M 4/02; H01M 4/13
USPC ........................................................ 429/322
See application file for complete search history.

(56) References Cited

U.S. PATENT DOCUMENTS

| | | | | |
|---|---|---|---|---|
| 2006/0078800 | A1* | 4/2006 | Konabe ......................... | 429/309 |
| 2007/0231693 | A1* | 10/2007 | Inagaki et al. ............. | 429/231.1 |
| 2009/0081553 | A1* | 3/2009 | Kondo et al. ................. | 429/314 |
| 2010/0203397 | A1 | 8/2010 | Thiemann-Handler et al. | |
| 2010/0291442 | A1* | 11/2010 | Wang et al. ............. | 429/231.95 |
| 2010/0330436 | A1 | 12/2010 | Ryou et al. | |

FOREIGN PATENT DOCUMENTS

| | | |
|---|---|---|
| JP | 200317126 A | 1/2003 |
| JP | 2007-080793 A | 3/2007 |
| JP | 2007-141745 A | 6/2007 |
| JP | 2008-010230 A | 1/2008 |
| JP | 200821424 A | 1/2008 |
| JP | 2008-059821 A | 3/2008 |
| JP | 200810307 A | 7/2008 |
| JP | 2008-300273 A | 12/2008 |
| JP | 2009-099570 A | 5/2009 |
| JP | 2009-230981 A | 10/2009 |
| JP | 2010106252 A | 5/2010 |
| JP | 2010-528412 A | 8/2010 |
| JP | 2010-528445 A | 8/2010 |
| JP | 2010186682 A | 8/2010 |
| JP | 2011-014478 A | 1/2011 |
| JP | 2011-119189 A | 6/2011 |
| JP | 2011-171260 A | 9/2011 |
| WO | 2008150075 A1 | 12/2008 |

* cited by examiner

*Primary Examiner* — Jonathan Jelsma
*Assistant Examiner* — Rashid Alam
(74) *Attorney, Agent, or Firm* — Cantor Colburn LLP

(57) ABSTRACT

An all-solid battery including a positive electrode including a binder, a negative electrode including a binder, and an electrolyte layer disposed between the positive electrode and the negative electrode and including a solid electrolyte, wherein at least one binder of the positive electrode and the negative electrode is cross-linked by a cross-linking agent.

16 Claims, 2 Drawing Sheets

ALL-SOLID BATTERY

CROSS-REFERENCE TO RELATED APPLICATIONS

This application claims priority to Japanese Patent Application No. 10-2012-268852, filed on Dec. 7, 2012, in the Japanese Patent Office and Korean Patent Application No. 10-2013-0112870, filed on Sep. 23, 2013, in the Korean Intellectual Property Office, and all the benefits accruing therefrom under 35 U.S.C. §119, the contents of which are incorporated herein in their entirety by reference.

BACKGROUND

1. Field

The present disclosure relates to all-solid batteries including solid electrolytes, the all-solid batteries having excellent cycle characteristics.

2. Description of the Related Art

Among lithium-ion secondary batteries, all-solid batteries using solid electrolytes are well known. An all-solid battery includes an electrolyte layer including a solid electrolyte, electrodes (positive and negative electrodes) formed on both sides of the electrolyte layer, and a current collector attached to each electrode. As the solid electrolyte, a sulfide-based, i.e., a sulfide-containing, solid electrolyte having high ion conductivity is well known.

JP 2010-106252, for example, discloses an all-solid battery having improved mechanical stability and durability of a solid electrolyte by including a sulfide-based solid electrolyte sheet in which polyethylene glycol is added to an end of a diene polymer and then vulcanized.

Also, JP 2010-186682 discloses an all-solid battery having improved ion conductivity by binding a sulfur component of a sulfide-based solid electrolyte material and a double bond of a binder polymer to reduce an amount of the binder polymer without reducing flexibility or processibility.

However, in an all-solid battery, adhesion between an electrode layer and a solid electrolyte layer may decrease due to expansion and contraction of an electrode active material corresponding to charging and discharging of the battery, thereby causing interface resistance. More particularly, a lithium-ion secondary battery using a sulfide-based solid electrolyte has low overvoltage of a reduction reaction, which causes lithium metal precipitation. Thus, as charging and discharging is repeated, due to a resistance distribution caused by the interface resistance in the all-solid battery, metal lithium precipitated on a surface of a negative electrode layer passes through cracks in a solid electrolyte layer to grow into a dendrite form, which then moves to a positive electrode and causes an internal short-circuit to occur. There accordingly remains a need in the art for materials and methods providing improved adhesion between an electrolyte layer and a solid electrolyte layer.

SUMMARY

Provided is an all-solid battery having excellent cycle characteristics by inhibiting or alleviating effects of expansion and contraction of an electrode active material due to charging and discharging.

Additional aspects will be set forth in part in the description which follows and, in part, will be apparent from the description, or may be learned by practice of the presented embodiments.

According to an aspect of the present disclosure, provided is an all-solid battery including:
a positive electrode including a binder;
a negative electrode including a binder;
an electrolyte layer disposed between the positive electrode and the negative electrode and comprising a solid electrolyte,
wherein at least one binder of the positive electrode and the negative electrode is cross-linked by a cross-linking agent.

According to another aspect of the present disclosure, the positive electrode and the negative electrode each includes a first binder that binds to the electrolyte layer and is inactive to the solid electrolyte, wherein the first binder is cross-linked by the cross-linking agent.

According to another aspect of the present disclosure, the positive electrode and the negative electrode each further includes a second binder that binds to a current collector and is more adhesive than the first binder to the current collector, wherein the second binder is optionally cross-linked by a cross-linking agent.

According to another aspect of the present disclosure, the positive electrode includes
a positive electrode layer including the first binder and a positive electrode active material; and
an adhesive layer for binding the current collector to the positive electrode layer,
wherein the adhesive layer includes the first binder and the second binder.

According to another aspect of the present disclosure, at least the positive electrode includes the solid electrolyte.

According to another aspect of the present disclosure, the cross-linking agent is sulfur.

According to another aspect of the present disclosure, the positive electrode and the negative electrode each includes a non-polar binder that binds to the electrolyte layer and is inactive to the solid electrolyte,
wherein at least one non-polar binder of the positive electrode and the negative electrode is cross-linked by the cross-linking agent.

According to another aspect of the present disclosure, the solid electrolyte includes a non-polar binder that is not cross-linked.

According to another aspect of the present disclosure, the non-polar binder includes a non-polar polymer including an unsaturated bond.

According to another aspect of the present disclosure, the binder is cross-linked by the cross-linking agent in the presence of a cross-linking catalyst.

According to another aspect of the present disclosure, the cross-linking catalyst is magnesium oxide or zinc oxide.

According to another aspect of the present disclosure, at least the binder of the negative electrode is cross-linked by the cross-linking agent.

According to another aspect of the present disclosure, the solid electrolyte is a sulfide-containing solid electrolyte.

According to another aspect of the present disclosure, the solid electrolyte includes lithium sulfide as a first component, and at least one compound selected from silicon sulfide, phosphorus sulfide, germanium sulfide, and boron sulfide as a second component.

According to another aspect of the present disclosure, the solid electrolyte includes lithium sulfide as the first component and phosphorus sulfide as the second component.

According to another aspect of the present disclosure, the positive electrode includes a layered halite structure.

According to another aspect of the present disclosure, the solid electrolyte includes a lithium-ion conductive crystallized glass.

According to another aspect of the present disclosure, the first binder includes at least one of a styrene-butadiene-styrene block polymer, a styrene-ethylene-butadiene-styrene block polymer, a styrene-(styrene/butadiene)-styrene block terpolymer blend; a styrene-ethylene/propylene-styrene block polymer; a styrene butadiene rubber; a butadiene rubber; a natural rubber; an isoprene rubber; and an ethylene-propylene-diene monomer rubber.

According to another aspect of the present disclosure, the second binder includes at least one of nitrile-butadiene rubber, chloroprene rubber, a polyacrylic acid ester copolymer, polyvinylidene fluoride, vinylidene fluoride-hexafluoro propylene copolymer, chlorinated polyethylene, polymethacrylic acid ester, polyvinyl alcohol, ethylene-vinyl alcohol copolymer, polyimide, polyamide, and polyimide amide.

According to another aspect of the present disclosure, an amount of the conductive material in the adhesive layer is about 50 weight % to about 95 weight %, an amount of the first binder in the adhesive layer is about 3 weight % to about 30 weight %, and an amount of the second binder in the adhesive layer is about 2 weight % to about 20 weight % based on the total weight of the adhesive layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
FIG. 1A is a schematic view of an all-solid battery according to an embodiment of the present disclosure and FIG. 1B is a schematic view of an all-solid battery according to another embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An all-solid battery according to an aspect of the present disclosure includes a positive electrode including a binder; a negative electrode including a binder; and an electrolyte layer disposed between the positive electrode and the negative electrode and including a solid electrolyte, wherein at least one binder of the positive electrode and the negative electrode is cross-linked by a cross-linking agent.

According to an embodiment of the present disclosure, when a binder of an electrode layer is cross-linked, mechanical properties such as elasticity and rigidity of the electrode layer improve, to the extent that when an electrode active material expands or contracts during charging and discharging of an all-solid battery, the electrode layer inhibits or alleviates effects thereof to maintain interface stability between the electrode layer and the electrolyte layer. Accordingly, interfacial adhesion between the electrode layer and the electrolyte layer may be maintained to provide an all-solid battery having excellent cycle characteristics.

The positive electrode and the negative electrode each may include a first binder that binds to an electrolyte layer and is inactive with respect to a solid electrolyte, wherein the first binder may be cross-linked by a cross-linking agent.

According to another embodiment of the present disclosure, the positive electrode and the negative electrode may each further include a second binder that binds to a current collector and is more adhesive than the first binder to the current collector, wherein the second binder may be optionally cross-linked by a cross-linking agent.

According to another embodiment of the present disclosure, the positive electrode may include a positive electrode layer including the first binder and a positive electrode active material; and an adhesive layer for binding the current collector to the positive electrode layer, wherein the adhesive layer includes the first binder and the second binder. Also, at least the positive electrode may include the solid electrolyte.

According to another embodiment of the present disclosure, the positive electrode and the negative electrode each includes a non-polar binder that binds to the electrolyte layer and is inactive with respect to the solid electrolyte, wherein at least one non-polar binder from among the positive electrode and the negative electrode may be cross-linked by the cross-linking agent.

Also, the solid electrolyte may include the non-polar binder. The non-polar binder included in the solid electrolyte does not include a cross-linking agent and thus, the non-polar binder may not be substantially cross-linked by the cross-linking agent.

Also, the non-polar binder may include a non-polar polymer that has an unsaturated bond to be cross-linked by the action of the cross-linking agent. Also, the binder may be cross-linked by the cross-linking agent in the presence of a cross-linking catalyst.

The solid electrolyte may be a sulfide-based, i.e., a sulfide-containing solid electrolyte.

Figure 1B:
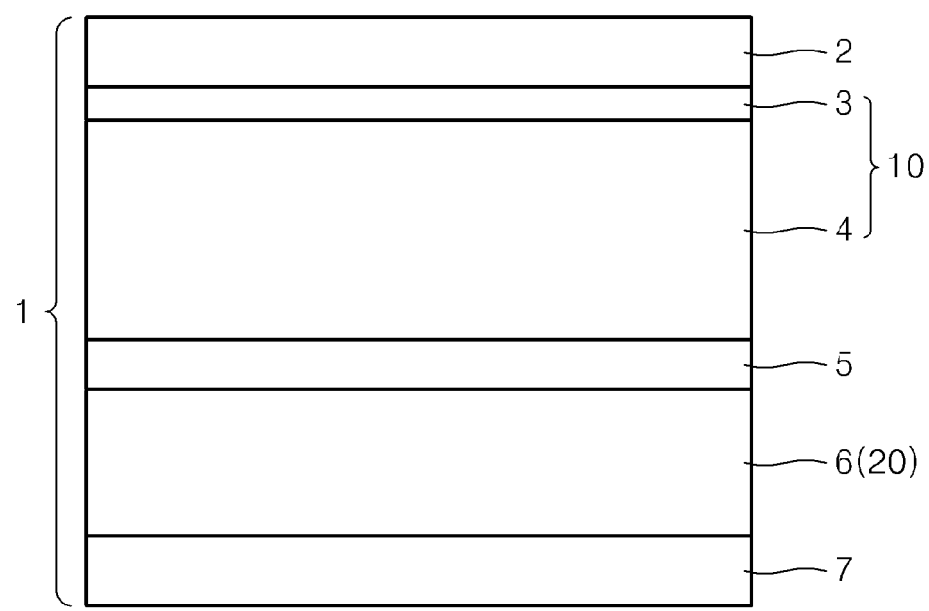

FIG. 1A is a schematic view of an all-solid battery according to an embodiment of the present disclosure. An all-solid battery 1' according to an embodiment of the present disclosure includes a positive current collector 2', a positive electrode layer 4', an electrolyte layer 5', a negative electrode layer 6', and a negative electrode current collector 7'. A positive electrode 10' includes the positive electrode layer 4' and a negative electrode 20' includes a negative electrode layer 6'. FIG. 1B is a schematic view of an all-solid battery according to another embodiment of the present disclosure. The all-solid battery of FIG. 1B includes the same features as the all-solid battery of FIG. 1A, except that the all-solid battery of FIG. 1B further includes an adhesive layer 3 between the positive current collector 2 and the positive electrode layer 4. The adhesive layer 3 and the positive electrode layer 4 are included in the positive electrode 10 of the all-solid battery 1. Also, the negative electrode layer 6 is included in the negative electrode 20 in the all-solid battery 1. Hereinafter, an all-solid battery according to an embodiment of the present disclosure will be described with reference to FIG. 1B.

Any conducting material may be used as the positive current collector 2. For example, aluminum, stainless steel, or nickel-plated steel may be used.

The adhesive layer 3 binds the positive current collector 2 and the positive electrode layer 4. The adhesive layer 3 may include an adhesive layer conductive material, a first binder, and a second binder. The adhesive layer conductive material may be, for example, carbon black such as Ketjen black and acetylene black; graphite; natural graphite; and synthetic graphite; which may be used alone or as a mixture thereof. The adhesive layer conductive material may be any material that may increase conductivity of the adhesive layer 3.

The first binder included in the adhesive layer 3 may be, for example, a non-polar polymer that does not have a polar functional group. Examples of polar functional groups include carboxylic acids and esters thereof, sulfur-containing acids and esters thereof such as sulfonic acids and esters thereof, phosphorus-containing acids and esters thereof, such as phosphoric acid and esters thereof and phosphonic acids and esters thereof, nitro groups, cyano groups, hydroxyl groups, ether groups, sulfhydryl groups, primary, secondary, or tertiary amine groups, primary or secondary amido groups, ureido groups, and sulfonyl groups. Accordingly, the first binder may be inactive with respect to a highly reactive solid electrolyte, and more particularly, to a sulfide-based solid electrolyte. The sulfide-based solid electrolyte is known to be active with respect to polar structures such as acids, alcohols, amines, and ethers. When present in adhesive layer 3, the first binder is used to bind the positive current collector 2 to the positive electrode layer 4. In this regard, when the positive electrode layer 4 includes the first binder or a similar component, the first binder in the adhesive layer 3 may counter diffuse against the first positive electrode layer binder through an interface between the adhesive layer 3 and the positive electrode layer 4, to thereby firmly bind the positive current collector 2 and the positive electrode layer 4.

Examples of the first binder include a styrene-based, i.e., a styrene-containing thermoplastic elastomer such as a styrene-butadiene-styrene block copolymer ("SBS"), a styrene-ethylene/butadiene-styrene block copolymer ("SEBS"), a styrene-(styrene/butadiene)-styrene block terpolymer blend; a styrene-ethylene/propylene-styrene block copolymer ("SEPS"), a styrene-isoprene-styrene block copolymer ("SIS"), a styrene-butadiene rubber ("SBR"); a butadiene rubber ("BR"); a natural rubber ("NR"); an isoprene rubber ("IR"); an ethylene-propylene-diene monomer ("EPDM") rubber, and a partially hydrogenated product thereof. Further examples include polystyrene, polyolefin, an olefin-based thermoplastic elastomer, a poly(cycloolefin), and a silicone polymer. When the first binder is to be crosslinked as further described below, the first binder contains unsaturated bonds, i.e., carbon-carbon double bonds.

The second binder may be a binder that is more adhesive than the first binder, with respect to the positive current collector 2. Whether a binder is more adhesive with respect to the positive current collector 2 may be determined by, for example, measuring the strength needed to separate a binder film from the positive current collector 2, wherein the binder film is obtained by coating a binder solution on the positive current collector 2 and drying the same. The second binder may be, for example, a polar functional group-containing polymer that includes a polar functional group to strongly bind to the positive current collector 2 through hydrogen bonding or the like. However, the second binder may be highly reactive to a sulfide-based solid electrolyte and thus, the second binder may be excluded from the positive electrode layer 4.

Examples of the second binder include, for example, nitrile-butadiene rubber ("NBR"), chloroprene rubber ("CR") and a partially hydrogenated product or a completely hydrogenated product thereof, a polyacrylic acid ester copolymer, polyvinylidene fluoride ("PVDF"), vinylidene fluoride-hexafluoro propylene copolymer ("VDF-HFP") and a carboxylate modified product thereof, chlorinated polyethylene ("CM"), polymethacrylic acid ester, polyvinyl alcohol, ethylene-vinyl alcohol copolymer, polyimide, polyamide, and polyimide amide. In addition, the second binder may be a polymer in which the first binder is co-polymerized with a monomer having carboxylic acid, sulfonic acid, or phosphoric acid group, for example a monomer including one of the foregoing groups and a vinyl group.

Proportions of the adhesive layer conductive material, the first binder, and the second binder in the adhesive layer 3 are not particularly limited, and may be, for example, about 50 percent by weight ("weight %") to about 95 weight % of the conductive material, about 3 weight % to about 30 weight % of the first binder, and about 2 weight % to about 20 weight % of the second binder based on the total weight of the adhesive layer.

The positive electrode layer 4 may include
a sulfide-based solid electrolyte,
a positive active material,
a positive electrode layer conductive material, and
a binder.

The positive electrode layer conductive material in the positive electrode layer 4 may be the same as the adhesive layer conductive material.

An example of the sulfide-based solid electrolyte may be an electrolyte that includes at least lithium sulfide as a first component, and at least one selected from silicon sulfide, phosphorus sulfide, germanium sulfide, and boron sulfide as a second component, for example, $Li_2S$—$P_2S_5$. The sulfide-based solid electrolyte is known to have greater lithium ion conductivity than that of other inorganic compounds. For example, the sulfide-based solid electrolyte may include $SiS_2$, $GeS_2$, or $B_2S_3$, in addition to $Li_2S$—$P_2S_5$. Also, the positive electrode layer 4 may further include $Li_3PO_4$, halogen, or a halogen compound, in addition to the sulfide-based solid electrolyte.

$Li_2S$ and $P_2S_5$ at a selected ratio may be heated at about 300° C. to 1200° C., for example 300° C. to 500° C., e.g., a temperature higher than melting temperatures thereof to melt-mix $Li_2S$ and $P_2S_5$, maintained at that temperature for a predetermined period of time, and then rapidly quenched to obtain the sulfide-based solid electrolyte (melt-quenching technique). Also, $Li_2S$—$P_2S_5$ may be obtained through mechanical milling. A mixing ratio of $Li_2S$ and $P_2S_5$ in $Li_2S$—$P_2S_5$ may be a molar ratio of about 50:50 to about 80:20, for example, about 60:40 to about 75:25, or for example, about 70:30 to about 80:20.

An electrolyte layer 5 of the all-solid battery 1 includes a solid electrolyte. Examples of the solid electrolyte may include a lithium-ion conductor including inorganic compounds as an inorganic solid electrolyte, in addition to the sulfide-based solid electrolyte. The lithium-ion conductor may be, for example, $Li_3N$, LISICON (available from Ceramatec, Inc. of Salt Lake City, Utah), $Li_{3+y}PO_{4-x}N_x$ ("LIPON"), $Li_{3.25}Ge_{0.25}P_{0.75}S_4$ ("thio-LISICON"), and $Li_2O$—$Al_2O_3$—$TiO_2$—$P_2O_5$ ("LATP"). The inorganic compound may have a crystal structure, an amorphous structure, a glass form structure, a glass ceramic (e.g., a crystallized glass) structure, or the like. Among these, lithium-ion conductivity of a crystallized glass structure is greater than that of the amorphous structure.

The positive active material may be any material that may reversibly intercalate and deintercalate lithium ions. Examples may include lithium cobalt oxide ("LCO"), lithium nickel oxide, lithium nickel cobalt oxide, lithium nickel cobalt aluminum oxide (hereinafter, referred to as "NCA"), lithium nickel-cobalt-manganese oxide (hereinafter, referred to as "NCM"), lithium manganese oxide, lithium iron phosphate, nickel sulfide, copper sulfide, sulfur, iron oxide, and vanadium oxide. The positive active material may be used alone or two or more thereof may be used together.

The positive active material may be, for example, a lithium salt of a transition metal oxide having a layered halite structure. The term "layer-form" as used herein refers to a thin sheet form, and the term "halite structure" refers to a sodium chloride structure, which is a type of crystal structure, and is a structure in which positive ions and negative ions, which separately have a face-centered cubic lattice, are dislocated by ½ of a corner of each lattice unit. Examples of lithium salts of transition metal oxides, which have the layered halite structure, include, for example, a lithium salt of a ternary transition oxide represented by $Li_{1-x-y-z}Ni_xCo_yAl_zO_2$ ("NCA") or $Li_{1-x-y-z}Ni_xCo_yMn_zO_2$ ("NCM") (0<x<1, 0<y<1, 0<z<1, and x+y+z<1).

The positive electrode layer binder may be, for example, a non-polar polymer that does not have a polar functional group as described above. Accordingly, the positive electrode layer binder may be inactive with respect to a highly reactive solid electrolyte, for example, to the sulfide-based solid electrolyte. The positive electrode layer binder may include the above-described first binder. When an electrolyte of the all-solid battery 1 is the sulfide-based solid electrolyte, which is highly reactive to the electrolyte, the positive electrode layer binder may be a non-polar polymer.

A cross-linking agent for cross-linking the first binder may be added to the positive electrode layer binder. When a crosslinking agent is present, the positive electrode layer binder contains unsaturated bonds, i.e., carbon-carbon double bonds. Unsaturated bonds in the first binder may be cross-linked by the cross-linking agent due to a heat treatment. Suitable materials for the cross-linking agent include sulfur-based, i.e., sulfur-containing materials such as sulfur or a sulfur donor, but the cross-linking agent is not limited thereto. As the positive electrode layer binder is cross-linked, a highly rubber-like elasticity that maintains a stable interface state between the positive electrode layer and solid electrolyte despite an expansion and contraction of the positive electrode active material during charging and discharging is obtained and a decrease in adhesion between the positive electrode layer and the solid electrolyte is prevented. The cross-linking agent may optionally be included in the adhesive layer 3. The heat treatment for the cross-linking may be performed after preparing a battery cell or the cross-linking may be performed during formation of the positive electrode.

The cross-linking agent may be any material that may cross-link the first binder to form a three-dimensional ("3D") network structure. When the first binder has a carbon-carbon unsaturated bond, sulfur or the like that does not generate a by-product in a cross-linkage reaction as described above may be used as the cross-linking agent. The cross-linking agent may be added in an amount needed for cross-linking the binder to be cross-linked. For example, the cross-linking agent may be added in an amount of about 5 parts by weight to about 25 parts by weight or about 10 parts by weight to about 20 parts by weight based on 100 parts by weight of the binder. When the amount of the cross-linking agent is in the range described above, a stable interface between the positive electrode layer and the solid electrolyte is obtained and a positive electrode layer 4 having increased charging efficiency of the positive electrode active material may be obtained.

The positive electrode layer 4 and/or the adhesive layer 3 may further include a cross-linking catalyst in addition to the cross-linking agent. Any material that catalyzes a cross-linkage reaction may be used as the cross-linking catalyst, but when the cross-linking agent is sulfur, a vulcanization catalyst may be suitably used. The vulcanization catalyst may be largely classified as inorganic and organic vulcanization catalysts, but when the solid electrolyte is a sulfide-based material, most organic vulcanization catalysts may react with the solid electrolyte to reduce lithium ion conductivity. Examples of the inorganic cross-linking catalyst include inorganic oxides such as magnesium oxide and zinc oxide. An amount of the cross-linking catalyst added to the positive electrode layer 4 and/or the adhesive layer 3 may be about 15 parts by weight to about 60 parts by weight or about 25 parts by weight to about 50 parts by weight based on 100 parts by weight of the cross-linking agent. When the amount of the cross-linking catalyst is within the range described above, a cross-linkage reaction may occur rapidly and a positive electrode layer 4 having increased charging efficiency of the positive electrode active material may be obtained.

When the positive electrode layer 4 is directly attached to the positive current collector 2, the positive electrode layer 4 may not sufficiently attach to the positive current collector 2. Accordingly, the adhesive layer 3 including the first binder and optionally the second binder may be disposed between the positive electrode layer 4 and the positive current collector 2. As a result, the first binder in the adhesive layer 3 firmly binds to the positive electrode layer 4, and, if present, the second binder in the adhesive layer 3 firmly binds to the positive current collector 2, thereby firmly binding the positive current collector 2 to the positive electrode layer 4. In this regard, when the positive electrode layer binder includes the first binder, the first binder in the adhesive layer 3 may counter-diffuse against the first binder in the positive electrode layer 4 through an interface between the adhesive layer 3 and the positive electrode layer 4, thereby firmly binding the positive electrode layer 4 and the positive current collector 2.

Proportions of the sulfide-based solid electrolyte, the positive active material, the positive electrode layer conductive material, and the positive electrode layer binder, which are included in the positive electrode, are not particularly limited. For example, the sulfide-based solid electrolyte may be in a proportion of about 20 weight % to about 50 weight %, the positive active material may be in a proportion of about 45 weight % to about 75 weight %, the positive electrode layer conductive material may be in a proportion of about 1 weight % to about 10 weight %, and the positive electrode layer binder may be in a proportion of about 0.5 weight % to about 4 weight %, based on the total mass of the positive electrode layer 4.

The electrolyte layer 5 may include the sulfide-based solid electrolyte and an electrolyte binder. The electrolyte binder may be a non-polar polymer that does not have a polar functional group as described above. Accordingly, the electrolyte binder is inactive with respect to the highly reactive solid electrolyte, for example to the sulfide-based solid electrolyte. The electrolyte binder may include the first binder. Unlike an electrode active material, the electrolyte layer 5 does not cause problems of expansion and contraction due to charging and discharging. Also, when materials other than the solid electrolyte are mixed in a solid electrolyte layer, grain boundary resistance between solid electrolyte particles tends to increase, and thus, the solid electrolyte layer may not include the cross-linking agent.

The first binder in the electrolyte layer 5 may counter-diffuse against the first binder in the positive electrode layer through an interface between the positive electrode layer 4 and the electrolyte layer 5, thereby firmly binding the positive electrode layer 4 and the electrolyte layer 5. Also, proportions of amounts of the sulfide-based solid electrolyte and the electrolyte binder are not particularly limited. For example, the sulfide-based solid electrolyte may be used in a proportion of about 95 weight % to about 99 weight %, and the electrolyte binder may be used in a proportion of about 0.5 weight % to about 5 weight %, based on a total weight of the electrolyte layer 5.

The negative electrode layer 6 may include the negative active material, the first binder, and optionally the second binder. The negative active material may include a graphite-based active material, for example, synthetic graphite, natural graphite, a mixture of the synthetic graphite and the natural graphite, and natural graphite coated with synthetic graphite.

When manufacturing the all-solid battery 1, the sulfide-based solid electrolyte may swell from the electrolyte layer 5 into the negative electrode layer 6. In other words, the negative electrode layer 6 may include the sulfide-based solid electrolyte. Accordingly, when the negative electrode layer 6 includes the second binder, the second binder reacts with the sulfide-based solid electrolyte in the negative electrode layer 6, and thus, the sulfide-based solid electrolyte in the negative electrode layer 6 may be degraded. However, when the negative active material is a graphite-based active material, swelling effects may not be significant. In other words, when the negative active material is a graphite active material, the negative electrode layer 6 may not necessarily include the sulfide-based solid electrolyte, and the sulfide-based solid electrolyte in the electrolyte layer 6 may not swell into an interface of the negative electrode layer 6 and the negative current collector 7.

Accordingly, the negative electrode layer 6 may include the second binder. The second binder firmly binds to the negative current collector 7 through hydrogen bonding. However, the second binder alone may not sufficiently bind the negative electrode layer 6 to the electrolyte layer 5. Accordingly, the negative electrode layer 6 may include the first binder, in addition to the second binder. As a result, the first binder may firmly bind to the electrolyte layer 5. The first binder in the negative electrode layer may counter-diffuse against the first binder in the electrolyte 5 through an interface between the negative electrode layer 6 and the electrolyte layer 5, thereby firmly binding the negative electrode layer 6 to the electrolyte layer 5.

As in the case of the positive electrode layer binder which is cross-linked by the cross-linking agent, the binder in the negative electrode layer may also include the cross-linking agent to cross-link the binder in the negative electrode layer. When the binder in the negative electrode layer is cross-linked, a highly rubber-like elasticity that maintains a stable interface state between the negative electrode layer 6 and the solid electrolyte despite expansion and contraction of the negative electrode active material during charging and discharging is obtained and a decrease in adhesion is prevented.

The cross-linking agent may be included in the adhesive layer 3.

The heat treatment for cross-linking may be performed after preparing a battery cell or during formation of the positive electrode.

Proportions of the negative active material, the first binder, and the second binder are not particularly limited. For example, a proportion of the negative active material may be about 95 weight % to about 99 weight %, a proportion of the first binder may be about 0.5 weight % to about 5 weight %, and a proportion of the second binder may be about 0.5 weight % to about 5 weight %, based on a total weight of the negative electrode layer 6.

The negative current collector 7 may be any conducting material, such as nickel, copper, stainless steel, or nickel-plated steel. Also, each layer may suitably include a known additive.

Hereinafter, a method of manufacturing the all-solid battery 1, according to an embodiment of the present disclosure, is described in detail. First, an adhesive layer coating solution including a first binder, an optional second binder, an adhesive layer conductive material, and a first solvent for dissolving the first binder and the second binder are prepared. In this regard, the first solvent may be, for example, an amide solution such as N-methylpyrrolidone ("NMP"), N,N-dimethyl formamide ("DMF"), and N,N-dimethylacetamide ("DMA"); an alkyl ester solvent such as butyl acetate and ethyl acetate; a ketone solvent such as acetone, methyl ethyl ketone, and methyl isobutyl ketone; an ether solvent such as tetrahydrofuran and diethyl ether; and an alcohol solvent such as methanol, ethanol, and isopropyl alcohol.

The adhesive layer 3 may have none of the sulfide-based solid electrolyte or may include a small amount of the sulfide-based solid electrolyte swelled from the positive electrode layer 4, and thus, a polar solvent may be used as the first solvent. The first solvent may dissolve the first binder and the second binder.

The adhesive layer coating solution is coated on the positive current collector 2 and then dried to prepare the adhesive layer 3. Also, the adhesive layer coating solution is coated on a substrate of a desktop screen printer or the like and then dried to prepare an adhesive film, and the adhesive film may be pressed on the positive current collector 2.

Thereafter, a positive electrode layer coating solution including a sulfide-based solid electrolyte and a positive active material, a positive electrode layer conductive material, a positive electrode layer binder (the first binder), a crosslinking agent, and a second solvent for dissolving the positive electrode layer binder is prepared. The second solvent dissolves the positive electrode layer binder (the first binder), but does not dissolve the second binder. In an embodiment, the second solvent is a non-polar solvent such as an aromatic hydrocarbon such as xylene, toluene, and ethyl benzene; and an aliphatic hydrocarbon such as pentane, hexane, and heptane.

The positive electrode layer coating solution is coated on the adhesive layer 3 and then dried to prepare a positive electrode layer 4. As a result, the first binder in the adhesive layer 3 dissolves in the second solvent and then swells into the positive electrode layer 4, thereby more firmly binding the adhesive layer 3 to the positive electrode layer 4. According to the embodiment, the positive electrode 10 is prepared by coating, and thus, a large surface area positive electrode 10 may be efficiently manufactured and a large capacity all-solid battery 1 may be easily manufactured.

Also, the second solvent does not dissolve the second binder, and thus, when the positive electrode layer coating solution is coated on the adhesive layer 3, the second binder in the adhesive layer 3 may be prevented from swelling into the positive electrode layer 4. As a result, the sulfide-based solid electrolyte in the positive electrode layer 4 may be prevented from degradation caused by the second binder. As a result of the processes described above, a positive electrode structure including the positive current collector 2, the adhesive layer 3, and the positive electrode layer 4 is manufactured.

In addition, the negative electrode layer coating solution including the first binder, the optional second binder, the negative active material, a crosslinking agent, and the first solvent is prepared. The negative electrode layer 6 does not need to include the sulfide-based solid electrolyte, and thus, a polar solvent may be used as the first solvent. The negative electrode layer coating solution is coated on the negative current collector 7 and then dried to prepare a negative electrode layer 6. As a result, a negative electrode structure is prepared.

Then, an electrolyte layer coating solution including the sulfide-based solid electrolyte, the electrolyte binder, and the second solvent is prepared. The second solvent dissolves the electrolyte binder (first binder), but does not dissolve the second binder. The electrolyte layer coating solution is coated on the negative electrode layer 6 and then dried to prepare an electrolyte layer 5. As a result, the first binder in the negative electrode layer dissolves in the second solvent and swells into the electrolyte layer 5, thereby firmly binding the electrolyte layer 5 and the negative electrode layer 6. Also, the second solvent does not dissolve the second binder, and thus, when the electrolyte layer coating solution is coated on the negative electrode layer 6, the second binder in the negative electrode layer 6 may be prevented from swelling into the electrolyte layer 5, thereby preventing degradation of the sulfide-based solid electrolyte in the electrolyte layer 5, caused by the second binder.

Thereafter, sheets including the positive electrode structure, the electrolyte layer 5, and the negative electrode structure are pressed to manufacture an all-solid battery 1. The all-solid battery 1 may then be heat-treated to cross-link the first binders in the positive electrode and the negative electrode by a cross-linking agent. According to an embodiment of the present disclosure, each layer of the all-solid battery 1 is prepared by coating, and thus, a surface area of each layer may be easily enlarged, thereby easily manufacturing a large capacity all-solid battery 1.

Hereinafter, the present disclosure will be described in greater detail with reference to the following Examples. The following Examples are for illustrative purposes only and are not intended to limit the scope of the present disclosure. Also, all processes in the Examples and Comparative Examples were performed at a dew point temperature of −55° C. or less in a dry room.

Example 1

Preparing an Adhesive Layer

Graphite (KS-4, available from Timcal, the same below) and acetylene black (available from Denki Chemicals, the same below) as adhesive layer conductive materials, styrene-based thermoplastic elastomer (hereinafter, binder A) (S.O.E 1611 available from Asahi Chemicals, the same below) as a first binder, and acid modified PVDF (hereinafter, binder B) (KF9200, available from Kureha, the same below) as a second binder were weighed at a weight % ratio of 60:10:15:15. The above materials and a suitable amount of N-methyl-2-pyrrolidone ("NMP") were inserted into a planetary mixer and then mixed at 3,000 revolutions per minute ("rpm") for 5 minutes to prepare an adhesive layer coating solution.

Then, an aluminum foil current collecting member having a thickness of 20 micrometers ("μm") was provided on a desktop screen printer (a product of Newlong precision industry, the same below) as a positive current collector 2 and an adhesive layer coating solution was coated on the aluminum-foil current collecting member by using a screen of 400 meshes. Thereafter, the positive current collector 2 coated with the adhesive layer coating solution was vacuum dried at a temperature of 80° C. for 12 hours. As a result, an adhesive layer 3 was formed on the positive current collector 2. A thickness of the adhesive layer 3 after drying was 7 μm.

Preparing a Positive Electrode Layer $LiNiCoAlO_2$ ternary powder as a positive active material, $Li_2S$—$P_2S_5$ (molar % of 80:20) amorphous powder as a sulfide-based solid electrolyte, vapor-grown carbon fiber powder as a positive electrode layer conductive material, binder A, sulfur powder as a cross-linking agent, and magnesium oxide as a cross-linking catalyst were weighed at a weight % of 60:33.75:5:1:0.2:0.05 and then mixed by using a planetary mixer to prepare a powdered mixture.

A xylene solution in which binder A is dissolved as a binder in a positive electrode layer was added to the mixture powder, such that an amount of the binder A is 1.0 weight % based on a total weight of the powdered mixture, to prepare a first mixture solution. A suitable amount of dehydrated xylene for adjusting viscosity was added to the first mixture solution to prepare a second mixture solution. To improve the dispersibility of the mixture powder, a zirconia ball having a diameter of 5 mm was added to the second mixture solution, such that each of empty space, the zirconia ball, and the powdered mixture may occupy ⅓ of a total volume of a mixture container, to prepare a third mixture solution. The third mixture solution was added to the planetary mixer and then stirred at 3,000 rpm for 3 minutes to prepare a positive electrode layer coating solution.

Thereafter, a sheet including the positive current collector 2 and the adhesive layer 3 was provided on the desktop screen printer, and the positive electrode layer coating solution was coated on the sheet by using a metal mask having a thickness of 150 μm. Then, the sheet coated with the positive electrode layer coating solution was dried by using a hot plate at a temperature of 40° C. for 10 minutes, and then vacuum dried at a temperature of 40° C. for 12 hours. As a result, the positive electrode layer 4 was formed on the adhesive layer 3. A total thickness of the positive current collector 2, the adhesive layer 3, and the positive electrode layer 4 was about 165 μm.

Then, the sheet including the positive current collector 2, the adhesive layer 3, and the positive electrode layer 4 was roll pressed by using a roll press machine having a gap of 10 μm to manufacture a positive electrode structure. A thickness of the positive electrode structure was about 120 μm.

Preparing a Negative Electrode Layer

Graphite powder (vacuum dried at a temperature of 80° C. for 24 hours) as a negative active material, binder A as a first binder, binder B as a second binder, sulfur as a cross-linking agent, and magnesium oxide as a cross-linking catalyst were weighed at a weight % of 94.0:1.0:4.75:0.2:0.05. The above materials and a suitable amount of NMP were inserted into a planetary mixer, stirred at 3,000 rpm for three minutes and then defoamed for one minute to prepare a negative electrode layer coating solution.

Thereafter, as the negative current collector 7, a copper current collector having a thickness of 16 μm was prepared, and the negative electrode layer coating solution was coated on the copper current collector by using a blade. A thickness (gap) of the negative electrode layer coating solution on the copper current collector was about 150 μm.

A sheet coated with the negative electrode layer coating solution was stored in a dryer heated to a temperature of 80° C. and then dried for 20 minutes. Thereafter, the sheet including the negative current collector 7 and the negative electrode layer 6 was roll pressed by using a roll press machine having a gap of 10 μm to prepare a negative electrode structure. A thickness of the negative electrode structure was about 100 μm. The sheet after rolling was vacuum-heated at a temperature of 40° C. for 12 hours.

Preparing an Electrolyte Layer

A xylene solution of binder A (an electrolyte layer binder) was added such that a proportion of the binder A is 1 weight %, sulfur was added as a cross-linking agent in a proportion of 0.2 weight %, and magnesium oxide was added as a cross-linking catalyst in a proportion of 0.05 weight % to $Li_2S$—$P_2S_5$ (molar % of 80:20) amorphous powder, which was used as a sulfide-based solid electrolyte, based on the total weight of the $Li_2S$—$P_2S_5$ amorphous powder to prepare a first mixture solution. A suitable amount of dehydrated xylene for adjusting viscosity was added to the first mixture solution to prepare a second mixture solution. To improve the dispersibility of a mixture powder, a zirconia ball having a diameter of 5 millimeters ("mm") was added to the second mixture solution, such that each of empty space, the zirconia ball, and the powdered mixture occupies ⅓ of a total volume of a mixture container, to prepare a third mixture solution. The third mixture solution was added to the planetary mixer and then stirred at 3,000 rpm for 3 minutes to prepare an electrolyte coating solution.

Thereafter, the negative electrode structure was provided on the desktop screen printer, and the electrolyte layer coating solution was coated on the negative electrode structure by using a metal mask having a thickness of 200 μm. Then, a sheet coated with the electrolyte layer coating solution was dried by using a hot plate at a temperature of 40° C. for 10 minutes, and then dried at a temperature of 40° C. for 12 hours. As a result, an electrolyte layer 5 was formed on the negative electrode structure. A thickness of the electrolyte layer 5 after drying was about 130 μm.

Preparing an all-Solid Battery

A negative electrode structure, a sheet including an electrolyte layer 5, and a positive electrode structure were each hole-punched with a Thompson knife blade, and the electrolyte layer 5 of the sheet and a positive electrode layer 4 of the positive electrode structure were bound together through a dry lamination method by using a roll press machine having a roll gap of 50 μm to prepare a laminate. Then, the laminate was heated in a nitrogen atmosphere at a temperature of 160° C. for 30 minutes to cross-link the same and to prepare a unit cell (a unit battery) of an all-solid battery 1.

Example 2

Preparing a Positive Electrode Structure

A positive electrode structure manufactured in the same manner as in Example 1 was heated in a nitrogen atmosphere at a temperature of 160° C. for 30 minutes.

Preparing a Negative Electrode Layer

A negative electrode structure manufactured in the same manner as in Example 1 was heated in a nitrogen atmosphere at a temperature of 160° C. for 30 minutes.

Preparing an Electrolyte Layer

An electrolyte layer was formed on a negative electrode structure prepared in the same manner as in Example 1, except that sulfur and magnesium oxide were not added.

Preparing an all-Solid Battery

A unit cell of the all-solid battery 1 was manufactured in the same manner as in Example 1, except that the laminate was not heated in a nitrogen atmosphere at a temperature of 160° C. for 30 minutes.

Example 3

Preparing a Positive Electrode Structure

A positive electrode structure was manufactured in the same manner as in Example 1, except that $LiNiCoAlO_2$ ternary powder as a positive active material, $Li_2S$—$P_2S_5$ (molar % of 80:20) amorphous powder as a sulfide-based solid electrolyte, vapor-grown carbon fiber powder as a conductive material, binder A, sulfur powder as a cross-linking agent, and magnesium oxide as a cross-linking catalyst were weighed at a weight % of 60:33.85:5:1:0.1:0.05.

Preparing a Negative Electrode Layer

A negative electrode structure was manufactured in the same manner as in Example 1, except that graphite powder as a negative active material, binder A as a first binder, binder B as a second binder, sulfur as a cross-linking agent, and magnesium oxide as a cross-linking catalyst were weighed at a weight % of 94.0:1.0:4.85:0.1:0.05.
Preparing an Electrolyte Layer An electrolyte layer was formed on a negative electrode structure prepared in the same manner as in Example 1, except that sulfur and magnesium oxide were not added.
Preparing an all-Solid Battery A unit cell of an all-solid battery was manufactured in the same manner as in Example 1.

Example 4

A unit cell of an all-solid battery was manufactured in the same manner as in Example 3, except that zinc oxide was used instead of magnesium oxide.

Comparative Example 1

A unit cell for an all-solid battery was manufactured in the same manner as in Example 1, except that sulfur and magnesium oxide were not added when manufacturing the positive electrode structure, the negative electrode layer, and the electrolyte layer.

Comparative Example 2

A unit cell for an all-solid battery was manufactured in the same manner as in Comparative Example 1, except that sulfur and magnesium oxide were added when manufacturing the electrolyte layer.
Evaluation of Internal Short Circuit During Charging A discharge capacity (milliampere-hour, mA·h) of the unit cell prepared in Example 1 was measured by continuously charging and discharging with an electrostatic current density of 0.05 milliamperes per square centimeter ("mA/cm$^2$") by using a charge and discharge evaluation device TOSCAT-3100, available from TOYO System (upper charge voltage of 4.0 volts ("V") and lower discharge voltage of 2.5 V). Based on the measured discharge capacities, current densities corresponding to 0.025 coulombs ("C"), 0.05 C, 0.075 C, 0.1 C, and 0.15 C were calculated. In this regard, 1 C refers to 1 current (milliampere, mA) per hour. Each unit cell was charged at the calculated current density and then the presence or absence of an internal short circuit was determined from a charge profile.

Figure 2:
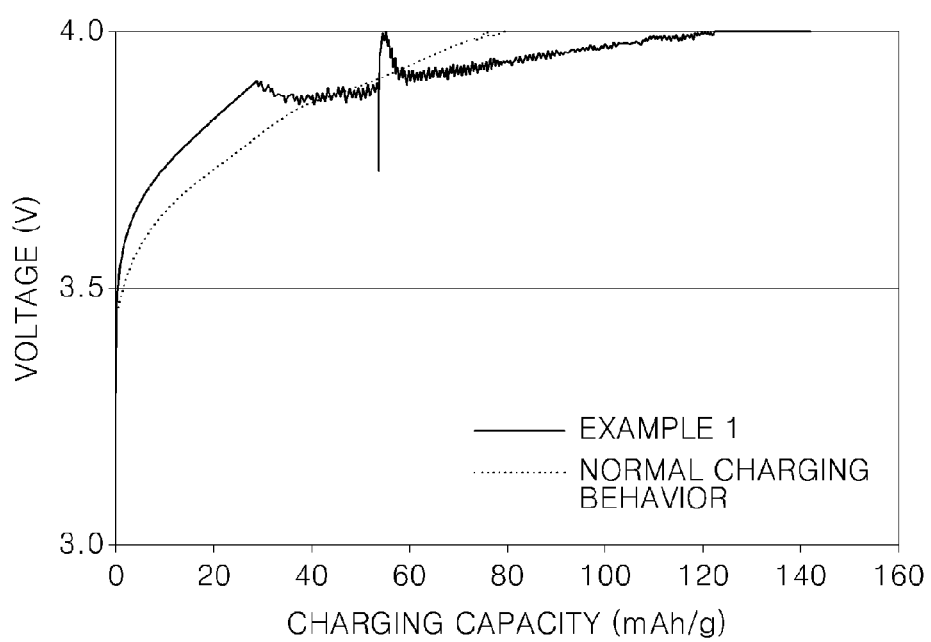
FIG. 2 is a graph of voltage (volts, V) versus charging capacity (milliampere-hour per gram, mA·h/g) showing a relationship between charging capacity and voltage of the all-solid battery of Example 1.

FIG. 2 is a graph showing a relationship between charging capacity and voltage of the all-solid battery of Example 1. A unit cell voltage increases stably for a battery that has been charged normally. However, a unit cell voltage does not increase stably for a unit cell having a minor internal short circuit. Internal short circuit results of each unit cell evaluated as described above are shown in Table 1 below.

When a charging current of Comparative Example 1 increases compared to that of Example 1, a dendrite of lithium precipitates, which causes a minor internal short circuit and unstable voltage, thereby creating a faulty battery. When a charging current of Comparative Example 2 increases compared to that of Example 2, a dendrite of lithium precipitates, which causes a minor internal short circuit and unstable voltage, thereby creating a faulty battery.

As described above, the positive electrode and the negative electrode in the present embodiment have binders that are cross-linked, and thus, adhesion between the solid electrolyte and an electrode interface is stably maintained, and an internal short circuit is prevented from occurring even after repeated charging and discharging of the all-solid battery. Also, although the binders in the positive electrode and the negative electrode in the embodiments above are cross-linked, at least one binder of the positive electrode and the negative electrode, or when the binder of the negative electrode is cross-linked, effects of the embodiments of the present disclosure may be achieved.

As described above, according to the one or more of the above embodiments of the present disclosure, provided is an all-solid battery having excellent characteristics obtained by inhibiting or alleviating effects of expansion and contraction of the electrode active material according to charging and discharging, which does not decrease adhesion between the electrode layer and the solid electrolyte layer, thereby preventing formation of dendrite.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. An all-solid battery comprising:
a positive electrode comprising a binder;
a negative electrode comprising a binder; and
an electrolyte layer disposed between the positive electrode and the negative electrode and comprising a solid electrolyte,
wherein at least one binder of the positive electrode and the negative electrode is cross-linked by a cross-linking agent,

TABLE 1

|  |  | Example 1 | Example 2 | Example 3 | Example 4 | Comparative Example 1 | Comparative Example 2 |
|---|---|---|---|---|---|---|---|
| Cross-linkage | Positive electrode | Present | Present | Present | Present | Absent | Absent |
|  | Solid electrolyte layer | Present | Absent | Absent | Absent | Absent | Present |
|  | Negative electrode | Present | Present | Present | Present | Absent | Absent |
| Charging current | 0.025 C | ○ | ○ | ○ | ○ | ○ | Short circuit | wherein the positive electrode and the negative electrode each comprises a first binder that binds to the electrolyte layer and is inactive to the solid electrolyte, wherein the first binder is cross-linked by the cross-linking agent, wherein the first binder comprises a non-polar binder, wherein the positive electrode and the negative electrode each further comprises a second binder that binds to a current collector and is more adhesive than the first binder to the current collector, wherein the second binder is optionally cross-linked by a cross-linking agent, wherein the positive electrode comprises a positive electrode layer comprising the first binder and a positive electrode active material, and an adhesive layer for binding the current collector to the positive electrode layer, wherein the adhesive layer comprises the first binder and the second binder, and wherein an amount of the first binder in the adhesive layer is about 3 weight % to about 30 weight %, and an amount of the second binder in the adhesive layer is about 2 weight % to about 20 weight % based on the total weight of the adhesive layer.

2. The all-solid battery of claim 1, wherein at least the positive electrode comprises the solid electrolyte.

3. The all-solid battery of claim 1, wherein the cross-linking agent is sulfur.

4. The all-solid battery of claim 1, wherein the solid electrolyte comprises a non-polar binder that is not cross-linked.

5. The all-solid battery of claim 1, wherein the non-polar binder comprises a non-polar polymer comprising an unsaturated bond.

6. The all-solid battery of claim 1, wherein at least the binder of the negative electrode is cross-linked by the cross-linking agent.

7. The all-solid battery of claim 1, wherein the solid electrolyte is a sulfide-containing solid electrolyte.

8. The all-solid battery of claim 1, wherein the solid electrolyte comprises lithium sulfide as a first component, and at least one compound selected from silicon sulfide, phosphorus sulfide, germanium sulfide, and boron sulfide as a second component.

9. The all-solid battery of claim 1, wherein the solid electrolyte comprises lithium sulfide as the first component and phosphorus sulfide as the second component.

10. The all-solid battery of claim 1, wherein the positive electrode comprises a layered halite structure.

11. The all-solid battery of claim 1, wherein the solid electrolyte comprises a lithium-ion conductive crystallized glass.

12. The all-solid battery of claim 1, wherein the first binder comprises at least one of a styrene-butadiene-styrene block polymer, a styrene-ethylene-butadiene-styrene block polymer, a styrene-(styrene/butadiene)-styrene block terpolymer blend; a styrene-ethylene/propylene-styrene block polymer; a styrene butadiene rubber; a butadiene rubber; a natural rubber; an isoprene rubber; an ethylene-propylene-diene monomer rubber, and a partially hydrogenated product of the foregoing.

13. The all-solid battery of claim 1, wherein the second binder comprises at least one of nitrile-butadiene rubber, chloroprene rubber, a polyacrylic acid ester copolymer, polyvinylidene fluoride, vinylidene fluoride-hexafluoro propylene copolymer, chlorinated polyethylene, polymethacrylic acid ester, polyvinyl alcohol, ethylene-vinyl alcohol copolymer, polyimide, polyamide, and polyimide amide.

14. The all-solid battery of claim 1, wherein an amount of a conductive material in the adhesive layer is about 50 weight % to about 95 weight %.

15. The all-solid battery of claim 1, wherein the binder is cross-linked by the cross-linking agent in the presence of a cross-linking catalyst.

16. The all-solid battery of claim 15, wherein the cross-linking catalyst is magnesium oxide or zinc oxide.

* * * * *